(12) United States Patent
Grossman et al.

(10) Patent No.: US 10,019,431 B2
(45) Date of Patent: *Jul. 10, 2018

(54) SYSTEMS AND METHODS FOR ACTIVE COLUMN FILTERING

(71) Applicant: PALANTIR TECHNOLOGIES INC., Palo Alto, CA (US)

(72) Inventors: Jack Grossman, San Francisco, CA (US); James Thompson, San Francisco, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,534

(22) Filed: Sep. 19, 2016

(65) Prior Publication Data

US 2017/0011022 A1 Jan. 12, 2017

Related U.S. Application Data

(63) Continuation of application No. 14/645,304, filed on Mar. 11, 2015, now Pat. No. 9,449,035, which is a
(Continued)

(51) Int. Cl.
*G06F 17/30* (2006.01)
*G06F 17/24* (2006.01)
(Continued)

(52) U.S. Cl.
CPC .......... *G06F 17/245* (2013.01); *G06F 3/0482* (2013.01); *G06F 17/218* (2013.01);
(Continued)

(58) Field of Classification Search
None
See application file for complete search history.

(56) References Cited

U.S. PATENT DOCUMENTS

| 5,632,009 A | 5/1997 | Rao et al. |
| 6,167,405 A | 12/2000 | Rosensteel, Jr. et al. |

(Continued)

FOREIGN PATENT DOCUMENTS

| AU | 2014250678 | 2/2016 |
| EP | 1 672 527 | 6/2006 |

(Continued)

OTHER PUBLICATIONS

Abadi et al, "The Design and Implementation of Modern Column-Oriented Database System", 2013.*
(Continued)

*Primary Examiner* — Hung Le
(74) *Attorney, Agent, or Firm* — Knobbe, Martens, Olson & Bear LLP

(57) ABSTRACT

Systems and methods are disclosed for active column filtering. In accordance with one implementation, a method is provided for active column filtering. The method includes providing a table having data values arranged in rows and columns, providing a first filter location indicator whose location is visually associated with a first column, and providing a first interface based on a selection of the first filter location indicator, wherein the first interface's location is visually associated with the first column. The method also includes acquiring a first filter input entered into the first interface, filtering the table based on the acquired first filter input, providing the filtered table for displaying, and providing an applied filter indicator, whose location is visually associated with the first column, the applied filter indicator including at least the first filter input.

20 Claims, 7 Drawing Sheets

Related U.S. Application Data continuation of application No. 14/268,964, filed on May 2, 2014, now Pat. No. 9,009,171.

(51) Int. Cl.
*G06F 3/0482* (2013.01)
*G06F 17/21* (2006.01)

(52) U.S. Cl.
CPC .... *G06F 17/3056* (2013.01); *G06F 17/30315* (2013.01); *G06F 17/30339* (2013.01); *G06F 17/30864* (2013.01); *G06F 17/30997* (2013.01)

(56) References Cited

U.S. PATENT DOCUMENTS

| | | | |
|---|---|---|---|
| 6,456,997 B1 | 9/2002 | Shukla | |
| 6,594,672 B1 | 7/2003 | Lampson et al. | |
| 6,980,984 B1 | 12/2005 | Huffman et al. | |
| 7,451,397 B2 | 11/2008 | Weber et al. | |
| 7,941,321 B2 | 5/2011 | Greenstein et al. | |
| 7,971,150 B2 | 6/2011 | Raskutti et al. | |
| 8,196,184 B2 | 6/2012 | Amirov et al. | |
| 8,239,394 B1* | 8/2012 | Hogue | G06F 17/30949 707/754 |
| 8,290,926 B2 | 10/2012 | Ozzie et al. | |
| 8,489,623 B2 | 7/2013 | Jain et al. | |
| 8,554,709 B2 | 10/2013 | Goodson et al. | |
| 8,595,234 B2 | 11/2013 | Siripuapu et al. | |
| 8,639,757 B1 | 1/2014 | Zang et al. | |
| 8,676,857 B1 | 3/2014 | Adams et al. | |
| 8,787,939 B2 | 7/2014 | Papakipos et al. | |
| 8,812,960 B1 | 8/2014 | Sun et al. | |
| 8,972,337 B1* | 3/2015 | Gupta | G06F 17/30563 707/602 |
| 8,996,470 B1* | 3/2015 | Hogue | G06F 11/28 707/687 |
| 9,069,842 B2 | 6/2015 | Melby | |
| 9,116,975 B2 | 8/2015 | Shankar et al. | |
| 9,146,954 B1 | 9/2015 | Boe et al. | |
| 9,229,952 B1 | 1/2016 | Meacham et al. | |
| 9,465,826 B2* | 10/2016 | Lakshminarayan | G06F 17/30306 |
| 2002/0095658 A1 | 7/2002 | Shulman | |
| 2003/0036848 A1 | 2/2003 | Sheha et al. | |
| 2003/0172014 A1 | 9/2003 | Quackenbush et al. | |
| 2003/0229848 A1* | 12/2003 | Arend | G06F 17/00 715/227 |
| 2004/0032432 A1 | 2/2004 | Baynger | |
| 2004/0111410 A1 | 6/2004 | Burgoon et al. | |
| 2004/0163039 A1* | 8/2004 | Gorman | G06F 17/246 715/255 |
| 2004/0193600 A1 | 9/2004 | Kaasten et al. | |
| 2004/0205524 A1 | 10/2004 | Richter et al. | |
| 2004/0249691 A1* | 12/2004 | Schell | G06Q 10/06311 705/7.13 |
| 2005/0065811 A1 | 3/2005 | Chu et al. | |
| 2005/0078858 A1 | 4/2005 | Yao et al. | |
| 2005/0154628 A1 | 7/2005 | Eckart et al. | |
| 2005/0154769 A1 | 7/2005 | Eckart et al. | |
| 2006/0074881 A1 | 4/2006 | Vembu et al. | |
| 2006/0184589 A1* | 8/2006 | Lees | G06F 17/30351 |
| 2006/0184889 A1 | 8/2006 | Molander | |
| 2006/0209085 A1 | 9/2006 | Wong et al. | |
| 2006/0242040 A1 | 10/2006 | Rader | |
| 2007/0150369 A1 | 6/2007 | Zivin | |
| 2007/0192265 A1 | 8/2007 | Chopin et al. | |
| 2007/0208736 A1 | 9/2007 | Tanigawa et al. | |
| 2007/0288842 A1* | 12/2007 | Averitt | G06F 17/5004 715/210 |
| 2008/0040275 A1 | 2/2008 | Paulsen et al. | |
| 2008/0162616 A1 | 7/2008 | Worley et al. | |
| 2008/0249983 A1 | 10/2008 | Meisels et al. | |
| 2009/0055251 A1 | 2/2009 | Shah et al. | |
| 2009/0150854 A1 | 6/2009 | Elaasar et al. | |
| 2009/0192957 A1 | 7/2009 | Subramanian et al. | |
| 2009/0327208 A1 | 12/2009 | Bittner et al. | |
| 2010/0030722 A1 | 2/2010 | Goodson et al. | |
| 2010/0114887 A1 | 5/2010 | Conway et al. | |
| 2010/0228812 A1 | 9/2010 | Uomini | |
| 2010/0306029 A1 | 12/2010 | Jolley | |
| 2010/0325526 A1 | 12/2010 | Ellis et al. | |
| 2011/0004498 A1 | 1/2011 | Readshaw | |
| 2011/0029526 A1 | 2/2011 | Knight et al. | |
| 2011/0078055 A1 | 3/2011 | Faribault et al. | |
| 2011/0131547 A1 | 6/2011 | Elaasar | |
| 2011/0161137 A1 | 6/2011 | Ubalde et al. | |
| 2011/0173032 A1 | 7/2011 | Payne et al. | |
| 2011/0181598 A1 | 7/2011 | O'Neall et al. | |
| 2011/0219321 A1* | 9/2011 | Gonzalez Veron | G06F 3/048 715/764 |
| 2011/0258158 A1 | 10/2011 | Resende et al. | |
| 2011/0289407 A1 | 11/2011 | Naik et al. | |
| 2011/0289420 A1 | 11/2011 | Morioka et al. | |
| 2012/0004904 A1 | 1/2012 | Shin et al. | |
| 2012/0036013 A1 | 2/2012 | Neuhaus et al. | |
| 2012/0075324 A1 | 3/2012 | Cardno et al. | |
| 2012/0116828 A1 | 5/2012 | Shannon | |
| 2012/0117082 A1 | 5/2012 | Koperda et al. | |
| 2012/0170847 A1 | 7/2012 | Tsukidate | |
| 2012/0197651 A1 | 8/2012 | Robinson et al. | |
| 2012/0203708 A1 | 8/2012 | Psota et al. | |
| 2012/0221553 A1 | 8/2012 | Wittmer et al. | |
| 2012/0245976 A1 | 9/2012 | Kumar et al. | |
| 2012/0296907 A1 | 11/2012 | Long et al. | |
| 2013/0006916 A1 | 1/2013 | McBride et al. | |
| 2013/0046635 A1 | 2/2013 | Grigg et al. | |
| 2013/0050217 A1 | 2/2013 | Armitage | |
| 2013/0073454 A1 | 3/2013 | Busch | |
| 2013/0110822 A1 | 5/2013 | Ikeda et al. | |
| 2013/0117011 A1 | 5/2013 | Ahmed et al. | |
| 2013/0151148 A1 | 6/2013 | Parundekar et al. | |
| 2013/0157234 A1 | 6/2013 | Gulli et al. | |
| 2013/0166554 A1* | 6/2013 | Yoon | G06F 17/30312 707/737 |
| 2013/0232106 A1* | 9/2013 | Shah | G06F 17/30345 707/609 |
| 2013/0267207 A1 | 10/2013 | Hao et al. | |
| 2013/0311375 A1 | 11/2013 | Priebatsch | |
| 2014/0067611 A1 | 3/2014 | Adachi et al. | |
| 2014/0095273 A1 | 4/2014 | Tang et al. | |
| 2014/0108068 A1 | 4/2014 | Williams | |
| 2014/0129261 A1 | 5/2014 | Bothwell et al. | |
| 2014/0149433 A1* | 5/2014 | Lakshminarayan | G06F 17/30306 707/750 |
| 2014/0156527 A1 | 6/2014 | Grigg et al. | |
| 2014/0258246 A1 | 9/2014 | Lo Faro et al. | |
| 2014/0310266 A1 | 10/2014 | Greenfield | |
| 2014/0316911 A1 | 10/2014 | Gross | |
| 2014/0351070 A1 | 11/2014 | Christner et al. | |
| 2015/0019394 A1 | 1/2015 | Unser et al. | |
| 2015/0073929 A1 | 3/2015 | Psota et al. | |
| 2015/0134666 A1 | 5/2015 | Gattiker et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0324868 A1 | 11/2015 | Kaftan et al. | |
| 2015/0347903 A1 | 12/2015 | Saxena et al. | |
| 2015/0378996 A1 | 12/2015 | Kesin et al. | |
| 2016/0004667 A1 | 1/2016 | Chakerian et al. | |
| 2016/0034545 A1 | 2/2016 | Shankar et al. | |
| 2016/0098173 A1 | 4/2016 | Slawinski et al. | |

FOREIGN PATENT DOCUMENTS

| | | |
|---|---|---|
| EP | 2863326 | 4/2015 |
| EP | 2884439 | 6/2015 |
| EP | 2884440 | 6/2015 |

(56) References Cited

FOREIGN PATENT DOCUMENTS

| WO | WO 2002/0065353 | 8/2002 |
|---|---|---|
| WO | WO 2010/0098958 | 9/2010 |

OTHER PUBLICATIONS

About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Bluttman et al., "Excel Formulas and Functions for Dummies," 2005, Wiley Publishing, Inc., pp. 280, 284-286.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Jelen, Bill, "Excel 2013 in Depth, Video Enhanced Edition," Jan. 25, 2013.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Palantir Technolgies, "Palantir Labs—Timeline," Oct. 1, 2010, retrieved from the internet https://www.youtube.com/watch?v=JCgDW5bru9M retrieved on Aug. 19, 2015.
Palmas et al., "An Edge-Bunding Layout for Interactive Parallel Coordinates" 2014 IEEE Pacific Visualization Symposium, pp. 57-64.
Psaltis, Andrew G., "Streaming Data—Designing the Real-Time Pipeline," Jan. 16, 2015, vol. MEAP VO3, pp. 0-12.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Notice of Allowance for U.S. Appl. No. 13/247,987 dated Mar. 17, 2016.
Notice of Allowance for U.S. Appl. No. 14/326,738 dated Nov. 18, 2015.
Notice of Allowance for U.S. Appl. No. 14/504,103 dated May 18, 2015.
Notice of Allowance for U.S. Appl. No. 14/923,364 dated May 6, 2016.
Notice of Allowance for U.S. Appl. No. 14/948,009 dated May 6, 2016.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Jun. 3, 2016.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/306,168 dated Feb. 28, 2015.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/645,304 dated Jan. 25, 2016.

(56) References Cited

OTHER PUBLICATIONS

Official Communication for U.S. Appl. No. 14/874,690 dated Jun. 1, 2016.
Official Communication for U.S. Appl. No. 14/874,690 dated Dec. 21, 2015.
Official Communication for U.S. Appl. No. 14/948,009 dated Feb. 25, 2016.
Official Communication for European Patent Application No. 14189344.6 dated Feb. 20, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 16152984.7 dated Mar. 24, 2016.
Official Communication for New Zealand Patent Application No. 622513 dated Apr. 3, 2014.

* cited by examiner

Suspicious email activity:

| Date & Time | From | Attachment | Size (in KB) |
|---|---|---|---|
| 4/3/14 11:52 AM | caroldavies@yaho... | | 1.3 |
| 4/3/14 11:12 AM | zoe.anderson@gma... | presentation.pdf | 5,823 |
| 4/3/14 9:15 AM | dan.reid@gma... | | 0.5 |
| 4/3/14 9:15 AM | marksmith77@att... | resume.docx | 1,823 |
| 4/3/14 8:44 AM | donotreply@exam... | hello.exe | 7,400 |
| 4/3/14 8:02 AM | customerservice@a... | video.exe | 722,554 |
| 4/2/14 7:37 PM | whitedan@gma... | | 2.8 |
| 4/2/14 6:16 PM | sudanhelp@sud... | | 1.1 |

FIG. 3

Suspicious email activity:

| Date & Time | From | Attachment | Size (in KB) |
|---|---|---|---|
| 4/3/14 11:52 AM | caroldavies@yaho... | | 1.3 |
| 4/3/14 11:12 AM | zoe.anderson@gma... | presentation.pdf | 5,823 |
| 4/3/14 9:15 AM | dan.reid@gma... | | 0.5 |
| 4/3/14 9:15 AM | marksmith77@att... | resume.docx | 1,823 |
| 4/3/14 8:44 AM | donotreply@exam.. | hello.exe | 7,400 |
| 4/3/14 8:02 AM | customerservice@a... | video.exe | 722,554 |
| 4/2/14 7:37 PM | whitedan@gma... | | 2.8 |
| 4/2/14 6:16 PM | sudanhelp@sud... | | 1.1 |

FIG. 5A

Suspicious email activity:

| Date & Time | gmail From | Attachment | Size (in KB) |
|---|---|---|---|
| 4/3/14 11:12 AM | zoe.anderson@gma... | presentation.pdf | 5,823 |
| 4/3/14 9:15 AM | dan.reid@gma... | | 0.5 |
| 4/2/14 7:37 PM | whitedan@gma... | | 2.8 |

| Date & Time | From | Attachment | Size (in KB) |
|---|---|---|---|
| 4/3/14 11:12 AM | zoe.anderson@gma... | presentation.pdf | 5,023 |
| 4/3/14 9:15 AM | dan.reid@gma... | | 0.5 |
| 4/2/14 7:37 PM | whitedan@gma... | | 2.8 |

Suspicious email activity:

FIG. 5D

Suspicious email activity:

| Date & Time | gmail or yahoo From | Attachment | Size (in KB) |
|---|---|---|---|
| 4/3/14 11:52 AM | caroldavies@yaho... | | 1.3 |
| 4/3/14 11:12 AM | zoe.anderson@gma... | presentation.pdf | 5,823 |
| 4/3/14 9:15 AM | dan.reid@gma... | | 0.5 |
| 4/2/14 7:37 PM | whitedan@gma... | | 2.8 |

SYSTEMS AND METHODS FOR ACTIVE COLUMN FILTERING

REFERENCE TO RELATED APPLICATIONS

This application is a continuation of U.S. Non-Provisional application Ser. No. 14/645,304, filed on Mar. 11, 2015, which is a continuation of U.S. Non-Provisional patent application Ser. No. 14/268,964, filed on May 2, 2014. The disclosures of the above-referenced applications are expressly incorporated herein by reference in its-their entirety.

BACKGROUND

Vast amounts of data are readily available to analysts, researchers, and laypeople today, on the one hand allowing them to perform more complicated and detailed data analyses than ever, but on the other hand making it more difficult to find the information that is relevant and filter out the information that is not.

BRIEF DESCRIPTION OF THE DRAWINGS

Reference will now be made to the accompanying drawings, which illustrate exemplary embodiments of the present disclosure. In the drawings:

FIG. 3 is an exemplary display displaying an exemplary table of data values, consistent with embodiments of the present disclosure;

FIGS. 5A-5F illustrate exemplary user interactions with exemplary tables of data values, consistent with embodiments of the present disclosure.

DESCRIPTION OF EXEMPLARY EMBODIMENTS

Reference will now be made in detail to several exemplary embodiments of the present disclosure, including those illustrated in the accompanying drawings. Whenever possible, the same reference numbers will be used throughout the drawings to refer to the same or like parts.

Embodiments disclosed herein are directed, among other things, to systems and methods that allow the user to filter large amounts of data in a quick, logical, and visually associative way. More specifically, the systems and methods can, among other things, provide a table having data values arranged in rows and columns, provide a first filter location indicator that is visually associated with a first column, provide a first interface at a location visually associated with the first column, acquire a first filter input entered into the first interface, filter the table based on the acquired first filter input, and provide, at a location visually associated with the first column, an applied filter indicator that includes at least the first filter input.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Figure 1:
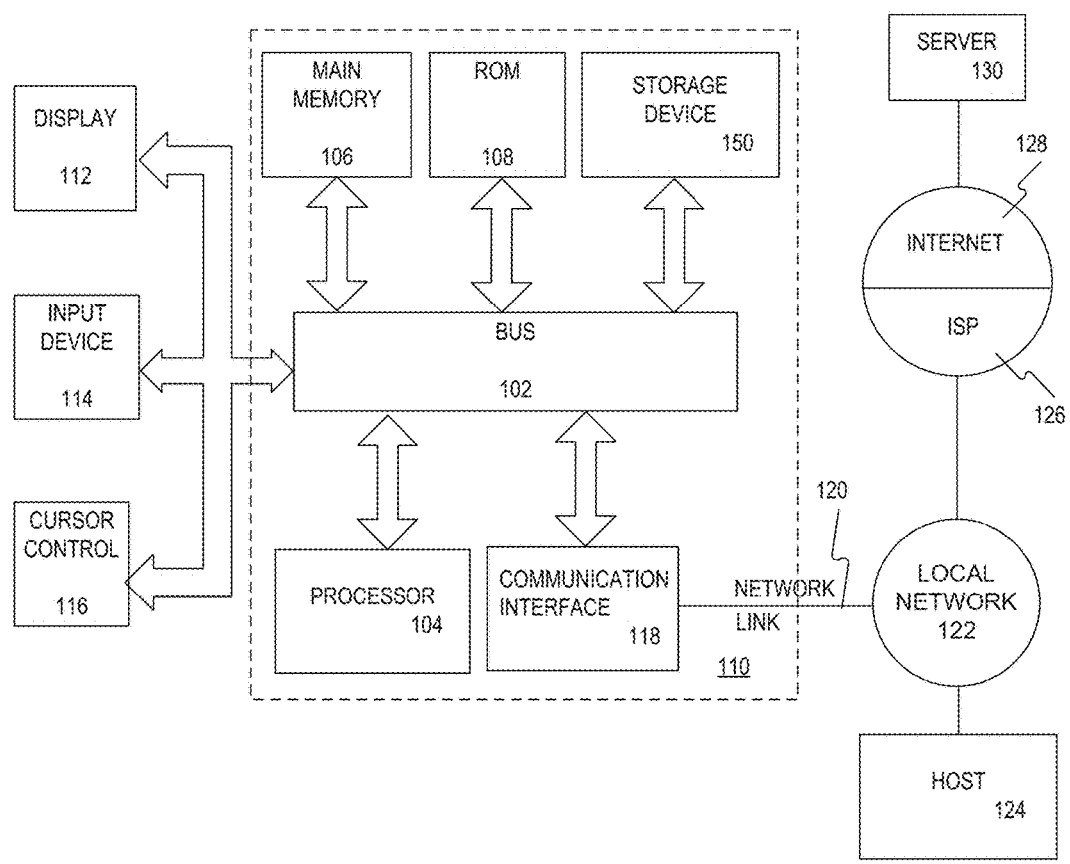
FIG. 1 is a block diagram of an exemplary electronic device, consistent with embodiments of the present disclosure.

By way of example, FIG. 1 is a block diagram that illustrates an implementation of an electronic device 110, which, as described above, can comprise one or more electronic devices. Electronic device 110 includes a bus 102 or other communication mechanism for communicating information, and one or more hardware processors 104, coupled with bus 102 for processing information. One or more hardware processors 104 can be, for example, one or more microprocessors.

Electronic device 110 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render electronic device 110 into a special-purpose machine that is customized to perform the operations specified in the instructions.

Electronic device 110 further includes a read only memory (ROM) 108 or other static storage device coupled to bus 102 for storing static information and instructions for processor 104. A storage device 150, such as a magnetic disk, optical disk, or USB thumb drive (Flash drive), etc., is provided and coupled to bus 102 for storing information and instructions.

Electronic device 110 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 110 can implement the techniques and other features described herein using customized hard-wired logic, one or more ASICs or FPGAs, firmware and/or program logic which in combination with the electronic device causes or programs electronic device 110 to be a special-purpose machine. According to some embodiments, the techniques and other features described herein are performed by electronic device 110 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to electronic device 110 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Electronic device 110 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams.

The signals through the various networks and the signals on network link 120 and through communication interface 118, which carry the digital data to and from electronic device 110, are example forms of transmission media.

Electronic device 110 can send messages and receive data, including program code, through the network(s), network link 120 and communication interface 118. In the Internet example, a server 130 might transmit a requested code for an application program through Internet 128, ISP 126, local network 122 and communication interface 118.

The received code can be executed by processor 104 as it is received, and/or stored in storage device 150, or other non-volatile storage for later execution.

Figure 2:
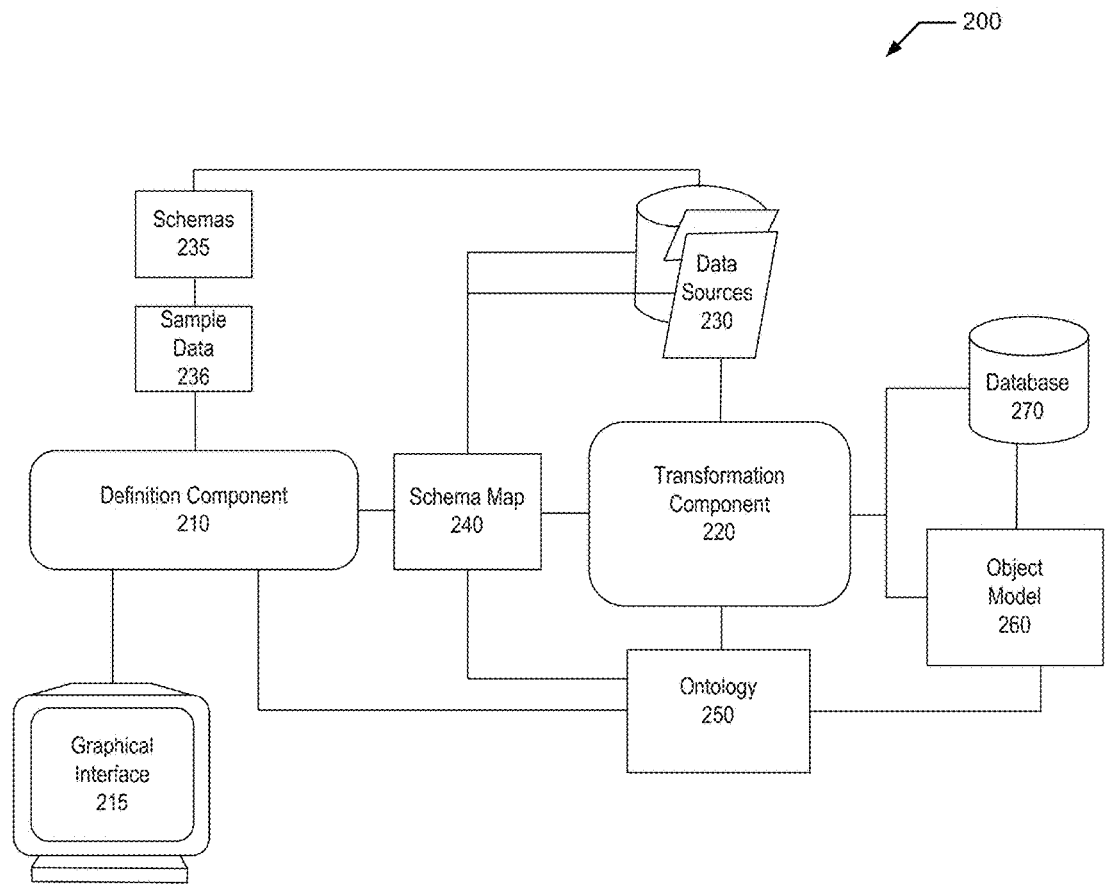
FIG. 2 is a block diagram of an exemplary data fusion system, consistent with embodiments of the present disclosure.

FIG. 2 shows, in block diagram form, an exemplary data fusion system 200, consistent with embodiments of the present disclosure. In some embodiments, data fusion system 200 can be a part of or communicatively coupled to electronic device 110. Among other things, system 200 can facilitate transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a translation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 2. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) are described in U.S. Pat. No. 7,962,495 (the '495 patent), issued Jun. 14, 2011, the entire contents of which are expressly incorporated herein by reference. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring to FIG. 2, schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify pre-existing mappings from schema map 240, if such mappings exist.

Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 features a visual workspace that visually depicts representations of the elements of ontology 250 for which mappings are defined in schema map 240. Graphical interface 215 also includes controls for adding new elements to schema map 240 and/or ontology 250, including objects, properties of objects, and relationships, via the visual workspace. After elements of ontology 250 are represented in the visual workspace, graphical interface 215 can further provide controls in association with the representations that allow for modifying the elements of ontology 250 and identifying how the elements of ontology 250 correspond to elements of schemas 235. Optionally, the graphical interface 215 can further utilize sample data 236 to provide the user with a preview of object model 260 as the user defines schema map 240. In response to the input via the various controls of graphical interface 215, definition component 210 can generate and/or modify ontology 250 and schema map 240.

In some embodiments, graphical interface 215 can provide an interface providing a user with the ability to add structure to an unstructured document stored in data sources 230 by tagging one or more portions (e.g., text) within the document. Defining tags and applying these tags to a portion of the document can create object, properties, or links creating a relationship between one or more objects and/or properties.

Transformation component 220 can be invoked after schema map 240 and ontology 250 have been defined or redefined. Transformation component 220 identifies schema map 240 and ontology 250. Transformation component 220 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 260 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or alternatively include temporary data structures generated from underlying data sources via data extraction components, such as a result set returned from a database server executing a database query.

Schema map 240, ontology 250, and schemas 235 can be stored in any suitable data structure(s), such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database.

FIG. 3 shows an exemplary table 300 as displayed, for example, on display 112, in accordance with some embodiments. Table 300 can include data values 302 arranged in one or more rows and one or more columns. Table 300 can also include a header row, providing, for each column, header area 304 and header information, such as title. Data values can include any type of characters, including, for example, one or more numeric characters, alphabetic characters, alphanumeric characters, and special characters. Data values can be unformatted or formatted, for example, as numbers, strings, dates, currency, and so forth. In some embodiments, the table can include empty cells that contain no data values or data values marked as empty. A row can contain data values that are associated with each other. For example, all data values in the same row can represent a particular event, each data value describing a different parameter related to that event. The rows in the table can be unsorted, or they can be sorted, for example, by a data value appearing in a particular column. For example, if each row represents a particular event, one of the data values positioned in a particular column can correspond to the date and time of that event. In this example, the rows can be sorted in a chronological or a reversed chronological order, the most recent events appearing at the top or at the bottom, respectively.

Figure 4:
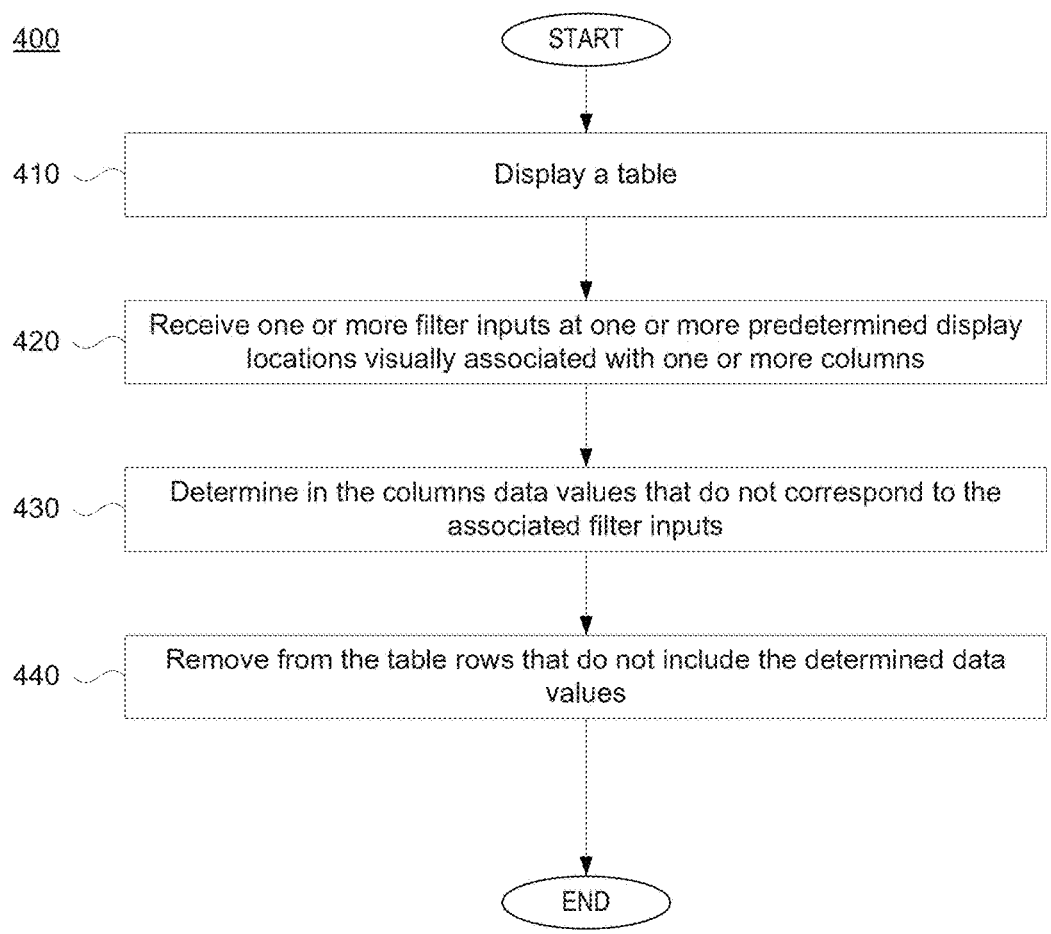
FIG. 4 is a flowchart of an exemplary method for active column filtering, consistent with embodiments of the present disclosure.

FIG. 4 shows a flowchart representing an exemplary method 400 of active column filtering. In some embodiments, method 400 can be performed by a client application (e.g., a web browser) running on a client device, by a server (e.g., a web server), or it can have some steps (or parts thereof) executed on the client device, and some steps (or parts thereof) executed on the server. Thus, method 400 can be performed by one or more electronic devices, such as electronic device 110. And while method 400 and the other following embodiments described herein can be performed by multiple electronic devices each having one or more processors, for purposes of simplicity and without limitation, these embodiments will be explained with respect to a single electronic device (e.g., electronic device 110). While the flowchart discloses the following steps in a particular order, it is appreciated that at least some of the steps can be moved, modified, or deleted where appropriate, consistent with the teachings of the present disclosure.

At step 410, the electronic device displays one or more data values arranged in a table (e.g., table 300).

At step 420, the electronic device receives filter input. In some embodiments, the filter input can be received automatically from another process or application. In other embodiments, the filter input can be received from a user at a predetermined filter location on the display, where the predetermined filter location is visually associated with a particular column. As discussed below, the user can input multiple filter inputs, each filter input being visually associated with one column, but each column capable of being visually associated with multiple filter inputs.

A location can be said to be "visually associated" with a particular column, for example, when the location's visual association with the particular column is stronger than its visual association with any other columns. For example, the location can be visually associated with a particular column when it is within a close proximity of the particular column, or when it is closer to the particular column than to any other column, as measured, for example, based on the horizontal distance between the location and the column. As another example, a location can be visually associated with a particular column when the location's horizontal position falls within the two boundaries of the particular column, or when the location's horizontal position is within a predetermined threshold from one of the boundaries of the particular column.

In some embodiments, the location can be visually associated with a particular column when the location is inside the header of the particular column, directly or substantially adjacent to the column header, has some overlap with the column header, and so forth.

Figure 5E:
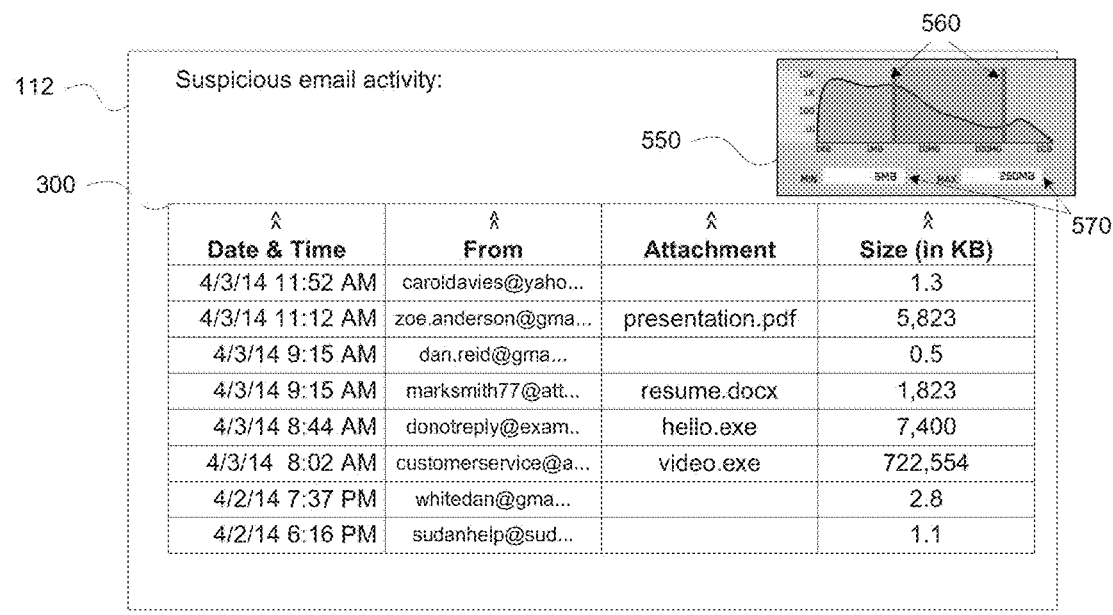
Figure 5F:
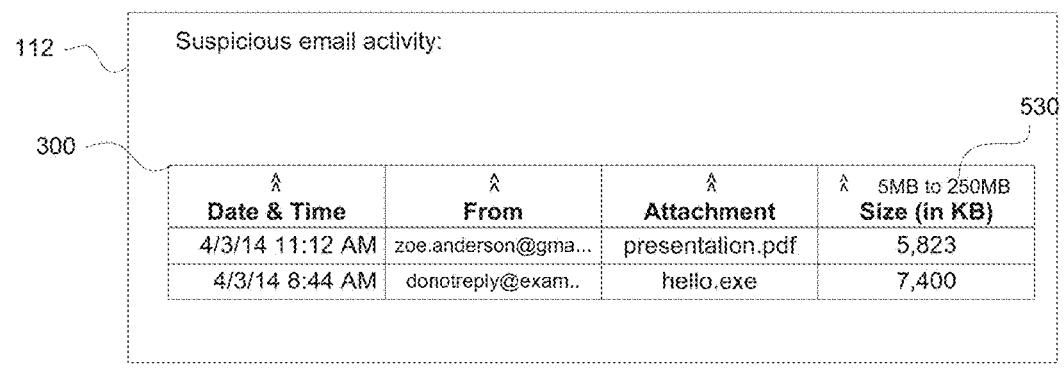

In some embodiments, the electronic device can display a filter location indicator for each column (or to each column to which a filter can be applied), which indicates to the user where he or she can click (or move a cursor to) in order to enter the filter input for each column. For example, FIG. 5A shows an exemplary table 300 having filter location indicators 510 displayed inside each column header 304. The user can select a filter location indicator, after which the electronic device can display, at or near the predetermined filter location, a GUI widget or interface suitable for receiving the filter input from the user, such as text box 520 illustrated in FIG. 5A, or any other suitable widget or interface. After the user enters the filter input, and after the filter input is applied by the electronic device to the table (as discussed in detail below), the applied filter input can be displayed at or near the predetermined filter location (see, e.g., applied filter indicator 530 in FIGS. 5B, 5D, and 5F).

While the filter location indicator, the interface for receiving the filter input, and the applied filter indicator are described herein as being displayed at or near the predetermined filter location, it is understood that they may or may not be displayed at the exact same location, but each of them, if displayed, can be displayed at a location that is visually associated with the corresponding column. For example, as illustrated in FIG. 5A, the filter location indicator can be located inside the column header (e.g., above the column title), the interface for receiving the filter input can be displayed above, below, or to the side of the column header (e.g., directly adjacent to the column header, substantially adjacent to the column header, with some overlap with the column header, and so forth), and the applied filter indicator can be located either inside the column header (e.g., instead of or next to the filter location indicator) or above, below, or to the side of the column header (e.g., directly adjacent to the column header, substantially adjacent to the column header, with some overlap with the column header, and so forth).

In addition, in some embodiments, the electronic device may not display the filter location indication, and the user can select any location that is visually associated with a particular column. For example, the user can select any location on the display (e.g., by clicking on it with a mouse or another pointing device), after which the electronic device can display a GUI interface (e.g., a text box) at or near the selected location, allowing the user to input the filter input into that interface. The electronic device can also determine, based on the selected location, which column is visually associated with the selected location, and apply the filter input to that column.

Allowing the user to enter his or her input at a location (either predetermined or selected in real time) that is visually associated with a particular column is beneficial to the user because the user does not have to divert his or her attention from the underlying data values and can immediately see which filter input applies to which column. It also allows the user to easily see how displayed data values are affected when the user modifies or cancels filter inputs.

In some embodiments, the entered filter input can include textual input, which can include any combination of one or more numeric characters, alphabetic characters, special characters, or any other types of characters. The textual filter input can be entered into a text box (e.g., text box 520) located at a location associated with a particular column.

In some embodiments, the filter input can also include one or more values selected by the user among a set of values. For example, the electronic device can display at the selected or predetermined location associated with a particular column a list (not shown) of one or more values, such as all data values appearing in the particular column, and the user can select one or more of those values. The list can be presented by the electronic device in a scrollable combo box, dropdown list, or another suitable GUI interface.

Still referring to step 420, in some embodiments, the filter input can include a range selected by the user. The range can be a numeric range defined, for example, by one limit (e.g., "all numbers greater than 100" or "all numbers less than 150"), by two limits (e.g., "all numbers between 100 and 150"), or by more than two limits (e.g., "all numbers between 100 and 150 and all numbers above 300"). The range can also be an alphabetical range defined by one, two, or more strings, in a manner similar to that described above. For example, the range can be defined as all strings that alphabetically fall between the strings "cat" and "dog."

In some embodiments, the user can define the range by using visual controls, instead of or in addition to manually entering the range limit(s). For example, the electronic device can assist the user by first displaying the range of all the data values (e.g., all data values in a particular column visually associated with the first location). The range of all values can be displayed, for example, in the form of a ruler, a slider, or another suitable GUI interface.

In some embodiments, the electronic device can display a graph or a histogram (e.g., graph 550 in FIG. 5E), representing the statistical distribution of all the values in a particular column. The electronic device can then display, on or near the graph, one or more moveable handles (e.g., handles 560 in FIG. 5E), which can be moved by the user and which define the desired range. The range can also be reflected in a numeric form (e.g., minimum and maximum values 570 in FIG. 5E), allowing the user to see and modify the exact range that is being selected.

As discussed above, the user can, in some embodiments, input multiple filter inputs at locations visually associated with the same column. For example, when the user finishes entering text into one text box (e.g., text box 520), another text box (e.g., text box 525 illustrated in FIG. 5C) can be automatically added by the electronic device below or next to the first text box, and so forth.

In some embodiments, the user can at any time update the filter input, for example, by modifying or adding text to the text boxes, selecting or unselecting values from a value list, or changing the range limits, and so forth. The user can also remove filters, for example, by displaying the filters via clicking on the filter location indicator, and then removing the filter inputs, e.g., by clicking on the "x" symbol 540 illustrated in FIG. 5C.

In some embodiments, filter inputs of different types, such as the types discussed above, or any other types, can be applied to and visually associated with the same column. In addition, as mentioned above, the electronic device can receive filter inputs to more than one column. For example, the user can first enter one or more filter inputs at one predetermined filter location that is in visual association with one column, and then enter one or more filter inputs at another location that is in visual association with another column. Thus, the user can add unlimited number of filter inputs of various types to any number of columns, and the electronic device can filter the table based on all the filter inputs, as described below.

At step 430, for each column that has any filter input visually associated with it, the electronic device can determine any data values in that column that correspond to the filter input. For example, when a filter input includes a string of characters, the electronic device can determine any data values in the associated column that contain the string of characters. For example, if the filter input includes a string of characters "dan," the electronic device can determine that the following data values correspond to the filter input: "browndan@example.com," "Sudanese," "Dan," and "Dan Brown." The determination can be either case sensitive, or not case sensitive, as in the above example. In some embodiments, the filter input can be inclusive and specify criteria for desired data values as described in the example above, or it can be exclusive and specify criteria for undesired data values. An example of an exclusive filter input can be "NOT dan," in which the corresponding data values determined at step 430 can include all data values that do not contain the string "dan," that is any values except "browndan@example.com," "Sudanese," "Dan," and "Dan Brown."

As another example, when the filter input includes a range of values, the electronic device can determine any data values in the associated column that correspond to the range, i.e., that fall within the range. For example, if the filter input includes a range "136-184," the electronic device can determine that the following data values correspond to the filter input: 140, 159, 159, and 184. The range can be exclusive or inclusive, as in the above example. Also, as illustrated in the above example, sometimes there can be several identical data values in the same column, so there could be several identical data values that correspond to the filter input.

As yet another example, when filter input includes a list of values selected by the user, the electronic device can determine, at step 430, any data values in the associated column that correspond to the selected values on the list.

As discussed above, in some embodiments, several filter inputs can be associated with one column. In these embodiments, the electronic device can either apply a logical "OR" or a logical "AND" between the several filter input, depending, for example, on a predetermined setting which can be modified by the user. If logical "OR" is applied, the electronic device will determine, at step 430, any data values in the column that correspond to either of the filter inputs (as illustrated in FIGS. 5C and 5D), and if logical "AND" is applied, the electronic device will determine any data values in the column that correspond to each of the filter input (not illustrated).

At step 440, the electronic device can remove (or hide) from the displayed table any rows that do not comprise the data values determined at step 430, that is, any rows whose data values in a particular column do not correspond to the one or more filter inputs visually associated with that column. In some embodiments, the removal occurs automatically when the electronic device determines that the user has entered or updated the filter input (e.g., any time the user adds or modifies any filter input). In other embodiments, the removal occurs only after the user indicates to the electronic device that he or she would like to refresh the table based on the updated filter inputs, for example, by clicking on a "Refresh" button.

While in the above examples the electronic device determines at step 430 data values that correspond to filter input(s), and then at step 440 removes rows that do not contain those data values, it is appreciated that the electronic device can instead determine at step 430 data values that do not correspond to filter input(s), and then at step 440 remove rows that contain those data values.

Steps 430 and 440 can be repeated for each of the columns that have any filter inputs associated therewith, and as a result, any rows that have not been removed by the electronic device satisfy each of the one or more filter inputs visually associated with one or more columns.

In some embodiments, as mentioned above, the initial set of filter inputs can be entered automatically entered and applied by the electronic device based on input from a file, a memory, or another process running on the electronic device or remotely. For example, a user can receive (e.g., through email) a link to a particular event among a plurality of events. The user can then select the link, which can cause the electronic device to present a table (e.g., table 300) and automatically apply a set of filter inputs such that only the particular event is visible, and the remaining events are hidden. The user can then manually modify or remove some of the automatically applied filter inputs, which can cause additional events to appear in the table.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. An electronic device comprising:
one or more computer-readable storage media configured to store instructions; and
one or more processors configured to execute the instructions to cause the electronic device to:
provide a table having data values arranged in rows and columns;
provide a first filter location indicator at a location that is visually associated with a first column, wherein the location of the provided first filter location indicator is visually associated with the first column based on the provided first filter location indicator being closer in proximity to the first column than to another in the table; and
provide a first interface based on a selection of the provided first filter location indicator, the first interface indicating a distribution of data values associated with the first column, the first interface further including one or more user-adjustable elements defining a range of values included in the indicated distribution of data values.

2. The electronic device of claim 1, wherein the first filter location indicator and the first interface are provided inside or substantially adjacent to a header of the first column.

3. The electronic device of claim 1, wherein the one or more processors are further configured to execute the instructions to cause the electronic device to:
acquire a first filter input entered into the first interface, wherein the first filter input comprises a string of characters; and
provide a filtered table for displaying based on the first filter input, wherein providing the filtered table comprises determining in the first column data values comprising the string of characters and removing from the table one or more rows that do not comprise determined data values in the first column.

4. The electronic device of claim 3, wherein the one or more processors are further configured to execute the instructions to cause the electronic device to:

provide a second interface;
acquire a second filter input entered into the second interface; further filter the table based on the acquired second filter input; and
update an applied filter indicator to comprise the first and the second filter inputs.

5. The electronic device of claim 4, wherein the first interface and the second interface are Graphical User Interface (GUI) widgets of different types.

6. The electronic device of claim 3, wherein the first filter input comprises a range of values, and providing the filtered table comprises determining in the first column data values corresponding to the range of values and removing from the table one or more rows that do not comprise the determined data values in the first column.

7. The electronic device of claim 6, wherein the one or more processors are further configured to execute the instructions to cause the electronic device to:
provide a chart representing distribution of data values in the first column, the chart comprising one or more user-adjustable handles defining the range of values.

8. The electronic device of claim 1, wherein the one or more processors are further configured to execute the instructions to cause the electronic device to:
provide a second filter location indicator whose location is visually associated with a second column;
provide a second interface based on a selection of the second filter location indicator;
acquire a first filter input entered into the first interface;
acquire a second filter input entered into the second interface; and
provide a filtered table for displaying based on the acquired first and second filter inputs.

9. A method for active column filtering, the method being performed by one or more processors and comprising:
providing a table having data values arranged in rows and columns;
providing a first filter location indicator at a location that is visually associated with a first column, wherein the provided first filter location indicator is visually associated with the first column based on the provided first filter location indicator being closer in proximity to the first column than to another column in the table; and
providing a first interface based on a selection of the provided first filter location indicator, the first interface indicating a distribution of data values associated with the first column, the first interface further including one or more user-adjustable elements defining a range of values included in the indicated distribution of data value.

10. The method of claim 9, wherein the first filter location indicator and the first interface are provided inside or substantially adjacent to a header of the first column.

11. The method of claim 9, further comprising:
acquiring a first filter input entered into the first interface, wherein the first filter input comprises a string of characters; and
providing a filtered table for displaying based on the first filter input, wherein providing the filtered table comprises determining in the first column data values comprising the string of characters and removing from the table one or more rows that do not comprise the determined data values in the first column.

12. The method of claim 11, further comprising: providing a second interface;
acquiring a second filter input entered into the second interface;
further filtering the table based on the acquired second filter input; and
updating an applied filter indicator to comprise the first and the second filter inputs.

13. The method of claim 12, wherein the first interface and the second interface are Graphical User Interface (GUI) widgets of different types.

14. The method of claim 11, wherein the first filter input comprises a range of values, and the process of filtering comprises determining in the first column data values corresponding to the range of values and removing from the table one or more rows that do not comprise the determined data values in the first column.

15. The method of claim 14, further comprising:
providing a chart representing distribution of data values in the first column, the chart comprising one or more user adjustable handles defining the range of values.

16. The method of claim 9, further comprising:
providing a second filter location indicator whose location is visually associated with a second column;
providing a second interface based on a selection of the second filter location indicator;
acquiring a first filter input entered into the first interface;
acquiring a second filter input entered into the second interface; and
providing a filtered table for displaying based on the acquired first and second filter inputs.

17. A non-transitory computer-readable medium storing a set of instructions that are executable by one or more electronic devices, each having one or more processors, to cause the one or more electronic devices to perform a method, the method comprising:
provide a table having data values arranged in rows and columns;
determine a location visually associated with the first column, wherein the location is determined based on determining that a distance between the first column and the location is lower than distances between any other column and the location;
provide a first interface based on a selection of the provided first filter location indicator.

18. The non-transitory computer-readable medium of claim 17, further comprising instructions executable by the one or more electronic devices to cause the one or more electronic devices to perform:
acquiring a first filter input entered into the first interface, wherein the first filter input comprises a string of characters; and
providing a filtered table for displaying based on the first filter input, wherein providing the filtered table comprises determining in the first column data values comprising the string of characters and removing from the table one or more rows that do not comprise determined data values in the first column.

19. The non-transitory computer-readable medium of claim 18, further comprising instructions executable by the one or more electronic devices to cause the one or more electronic devices to perform:
providing a second interface;
acquiring a second filter input entered into the second interface;
further filtering the table based on the acquired second filter input; and
updating an applied filter indicator to comprise the first and the second filter inputs.

20. The non-transitory computer-readable medium of claim 17, wherein the distance between the first column and the location is a horizontal distance.

* * * * *